United States Patent [19]

Bowen et al.

[11] 4,293,615
[45] Oct. 6, 1981

[54] POLYVINYL BUTYRAL LAMINATES

[75] Inventors: Griffith Bowen, Wilmington, Del.; Peter A. Fowell, Chadds Ford, Pa.

[73] Assignee: E. I. Du Pont de Nemours and Company, Wilmington, Del.

[21] Appl. No.: 154,853

[22] Filed: May 30, 1980

[51] Int. Cl.$^3$ .................. B32B 27/36; B32B 27/42
[52] U.S. Cl. .................. 428/412; 260/33.2 R; 428/411; 428/437; 428/501; 428/524; 428/525; 428/522
[58] Field of Search .............. 428/437, 412, 525, 524, 428/411, 501, 522; 260/31.4 R, 33.2 R; 525/58, 56

[56] References Cited

U.S. PATENT DOCUMENTS

| | | | |
|---|---|---|---|
| 2,425,755 | 8/1947 | Roberts | 260/33.2 R |
| 2,677,700 | 5/1954 | Jackson | 260/33.2 R |
| 2,680,724 | 6/1954 | Oppenheim | 260/33.2 R |
| 2,718,509 | 8/1955 | Lundsted | 260/33.2 R |
| 3,141,407 | 7/1964 | Leeds | 260/33.2 R |
| 3,148,097 | 9/1964 | Gilman | 260/33.2 R |
| 3,203,828 | 8/1965 | Garnish | 428/524 |
| 3,357,930 | 12/1967 | Marks | 260/33.2 R |
| 3,406,086 | 10/1968 | Foster | 428/437 |
| 3,437,553 | 4/1969 | Hailstone | 260/33.2 R |
| 3,471,356 | 10/1969 | Kolb | 428/437 |
| 3,537,922 | 11/1970 | Gilman | 260/33.2 R |
| 3,539,442 | 11/1970 | Buckley | 428/437 |
| 4,230,771 | 10/1980 | Phillips | 428/437 |

OTHER PUBLICATIONS

Union Carbide, "Bakelite ®Vinyl Butyral Resins", Sep. 1971.

*Primary Examiner*—Ellis P. Robinson

[57] ABSTRACT

Laminates of glazing material and polyvinyl butyral plasticized with propylene oxide oligomers.

5 Claims, No Drawings

POLYVINYL BUTYRAL LAMINATES

BACKGROUND OF THE INVENTION

Polyvinyl butyral is widely used in combination with one or more layers of glass to provide a composite which is resistant to shattering. The polyvinyl butyral typically contains a plasticizer to provide a balance of mechanical properties satisfactory for the subsequent handling and performance requirements. While many different plasticizers have previously been suggested for use in combination with polyvinyl butyral, continual effort has been directed to the discovery of plasticizers which combine outstanding performance characteristics, low cost and applicability to a wide range of glazing materials.

SUMMARY OF THE INVENTION

The instant invention provides laminated composites based on plasticized polyvinyl butyral.

Specifically, the present invention provides a laminar structure comprising at least one layer of glazing material and a sheet of plasticized polyvinyl butyral having a hydroxyl content of about from 15 to 30% by weight, calculated as vinyl alcohol, and, in compatible admixture therewith, about from 10 to 70 parts per hundred parts by weight of resin of at least one propylene oxide oligomer of the general formula

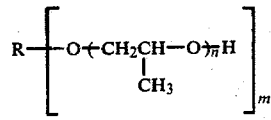

wherein R is a linear or a branched aliphatic or cycloaliphatic, aralkyl, aromatic, alkoxyalkyl or heterocyclic radical of 1 to 14 carbon atoms, n is an integer of from 1 to 30 and has an average value of about from 1 to 20, and m is an integer of from 1 to 3.

DETAILED DESCRIPTION OF THE INVENTION

The present invention is based on the discovery of the particular suitability of propylene oxide oligomers of 2-ethylhexanol in polyvinyl butyral laminates. The compositions have the following general formula

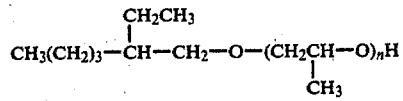

These compositions can be prepared by first forming the potassium salt of 2-ethylhexanol. The salt can be made by combining the alcohol with potassium metal and appropriate solvent, such as tetrahydrofuran, in an inert atmosphere such as nitrogen. The reaction should be carried on at elevated temperatures, and preferably the reflux temperature of the solvent. The potassium metal is first added to the solvent with vigorous stirring. When the metal is melted and well dispersed, the alcohol is added with additional quantities of solvent. The resulting mixture is then heated at reflux until all of the potassium is reacted, and then cooled to room temperature. The solvent can then be removed under reduced pressure to leave the desired potassium salt in a form of a waxy solid.

The potassium salt of 2-ethylhexanol can be reacted directly with propylene oxide at moderately elevated temperatures of 50°–100° C. to form the oligomer. The product can be purified by washing with dilute hydrochloric acid, saturated sodium bicarbonate solution and brine. The final product is a colorless to pale yellow liquid at room temperature.

The present invention is also based on the discovery of the unique suitability of a wide variety of known propylene oxide oligomers as plasticizers for polyvinyl butyral used for making laminates of glazing material. These oligomers can be represented by the formula

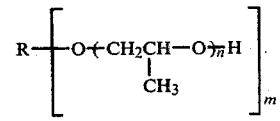

wherein R is a linear or branched aliphatic, cycloaliphatic, aralkyl, aromatic, alkoxy alkyl or heterocyclic radical of 1 to 14 carbon atoms, n is an integer of 1 to 30 and averages from 1 to 20, and m is an integer of from 1 to 3.

As will be recognized by those skilled in the art, a number of variations in the structure of a particular propylene oxide oligomer of the above formula will be observed. The number of units derived from propylene oxide, indicated by "n", may vary from one molecule to another within an oligomer, and even within a single molecule when "m" is 2 or 3. In addition, minor quantities of the propylene oxide units, for example, up to about 15%, can be replaced by ethylene oxide units without changing the basic character of the compound. Moreover, a minor percentage of the methyl groups in the propylene oxide units may be present in the reverse molecular position of that shown in the formula.

The average molecular weight of the propylene oxide oligomers in general is about from 300 to 2500. Oligomers having an average molecular weight below 300 exhibit excessive volatility. Molecular weights in excess of 2500 generally result in incompatibility.

The specific R groups used in the oligomers can vary widely. Representative R groups that are particulary useful for oligomers based on mono-ols include methyl, ethyl, propyl, isopropyl, butyl, isobutyl, sec-butyl, t-butyl, sec-capryl, cyclohexyl, tetrahydrofurfuryl, benzyl, decyl, dodecyl, tridecyl, phenyl, and the alkoxy and ester substituted derivatives of these groups. Representative R groups that are particularly useful for oligomers based on diols include those derived from ethylene glycol, propylene glycol, tetramethylene glycol, hexylene glycol and cyclohexanedimethanol. Representative R groups that are particularly useful for oligomers based on triols include those derived from glycerine, trimethylolmethane and trimethylolpropane.

The propylene oxide oligomers are incorporated into polyvinyl butyral as a plasticizer using techniques typical of those applicable to other plasticizers. The polyvinyl butyral and plasticizer are present in quantities which result in a compatible admixture. The quantities of plasticizer which can be added to polyvinyl butyral vary according to the residual hydroxyl content of the polyvinyl butyral as well as the particular oligomer used. In general, less than about 10 pph of plasticizer will not provide any substantial plasticizing effect, while concentrations in excess of 70 pph will result in unsatisfactory structural integrity. Within this range, the maximum concentration of plasticizer will be determined by the concentration at which the particular compound becomes incompatible with the polyvinyl butyral.

As recognized by those skilled in the art, plasticizer incompatibility can result in a haziness in the polyvinyl butyral sheeting, particularly with higher molecular weight plasticizers, and results in diminished tackiness of the film. Incompatibility may also be indicated by plasticizer exuding from the surface of the finished film. However, in general, a maximum compatible concentration of plasticizer, in parts per hundred parts by weight, can be determined according to the following guidelines. These guidelines apply to oligomers having a narrow molecular weight distribution, that is, wherein the ratio of weight average molecular weight to number average molecular weight is less than about 1.2. The maximum compatible concentrations for oligomers having a broader molecular weight distribution can be readily determined by those skilled in the art.

When a plasticizer is used in accordance with the instant invention which is based on a triol, that is, when m=3, and R is derived from trimethylolpropane, the maximum concentration, at room temperature and a relative humidity of less than 90%, in parts per hundred can be determined by the following equations. When the hydroxyl content of the polyvinyl butyral is less than or equal to 22, the maximum concentration is $$375 - 10X - (Y/18)^{1.1}$$

When the hydroxyl content of the polyvinyl butyral is greater than or equal to 22, the maximum concentration is $$243 - 4X - (Y/18)^{1.1}$$

wherein X is the hydroxyl content of the polyvinyl butyral, as percent by weight, calculated as vinyl alcohol, into which the plasticizer is incorporated, and Y is the average molecular weight of the oligomer.

When the plasticizer is based on a diol, that is, when m is 2, and R is derived from propylene glycol, the maximum compatible concentration can be determined by the following formula $$420 - 10X - (Y/12)^{1.1}$$

wherein X and Y have the same meaning as indicated above.

The maximum compatible plasticizer concentration for those propylene oxide oligomers based on monoalcohols, that is, when m is 1, varies with the number and configuration of carbon atoms in the R group of the oligomer. Representative formulas for the calculation of the maximum compatible plasticizer concentration are as follows:

| R | Maximum Compatible Concentration |
|---|---|
| Methyl | $485 - 10X - \left(\frac{Y}{6}\right)^{1.1}$ |
| Butyl | $440 - 10X - \left(\frac{Y}{6}\right)^{1.1}$ |
| Ethylhexyl | $430 - 10X - \left(\frac{Y}{6}\right)^{1.1}$ |
| Tridecyl | $420 - 10X - \left(\frac{Y}{6}\right)^{1.1}$ |

In general, the concentrations indicated by the above formulas will represent the maximum compatible concentration of plasticizer within 5 pph.

The propylene oxide oligomers of the present invention provide outstanding plasticization of polyvinyl butyral. It has been found that the present compositions are compatible with polyvinyl butyral over a wide range of hydroxyl contents, and provide sheeting with excellent dimensional stability, tensile strength and stiffness. Moreover, the present plasticizers are compatible with other plasticizers used for polyvinyl butyral, including triethyleneglycol di-2-ethylbutyrate (3GH), as well as tetraethyleneglycol di-n-heptanoate (4G7).

The plasticized polyvinyl butyral sheeting can be laminated to one or more layers of glazing material according to the procedures generally used in the art and illustrated, for example, in U.S. Pat. Nos. 2,293,656, 3,838,091 and 4,107,366. A particularly surprising advantage of the present invention is that the resulting plasticized polyvinyl butyral sheeting can be used not only with glass, but polymethyl methacrylate and polycarbonate sheeting as well. This is in marked contrast to many polyvinyl butyral plasticizers previously used in the art, which tended to cause undesirable interaction with the plastic materials.

The present invention is further illustrated in the following specific examples, in which parts and percentages are by weight unless otherwise indicated. In the Examples, n in each propylene oxide oligomer molecule is from 1 to 30 and averages about from 1 to 20.

In these Examples, the following tests and procedures were used:

PVB Residual Hydroxyl (Weight Percent as VA): ASTM D1396.

Tensile Strength: ASTM D1708 with samples conditioned and run at 20.6°±0.6° C. and 23.5±2% RH instead of 23°±2° C. and 50±5% RH.

5% Secant Modulus: ASTM D882 with samples conditioned and run at 20.6°±0.6° C. and 23.5±RH instead of 23°±2° C. and 50±5% RH.

Pummel Break: SAE J1208

Mean Break Height: ANSI Z26.1 using a staircase method to determine mean break height instead of the one level test of Z26.1 as described in U.S. Pat. No. 3,718,516.

Edge Stability: ANSI Z26.1.

Creep (% Elongation): Test sheeting samples nominally 0.03 inch (0.76 mm) thick are conditioned for 4 hours at 68°±2° F. (20.0°±1.1° C.). The samples are then die cut to 0.75×4 inches (1.9×10.2 cm), marked and clipped into the test oven at 65±°C. for 1 hour. A 10 psi (69 kPa) load is applied to each specimen and the elongation measured at 30 minutes. The results are calculated by dividing the gage length after testing by the initial gage length and multiplying by 100.

EXAMPLE 1

Potassium metal (5.58 g, 0.143 mole) was placed in 100 ml of dry tetrahydrofuran under nitrogen. The mixture was heated to the reflux temperature with vigorous stirring. When the potassium had melted and was well dispersed, 2-ethylhexanol (18.5 g, 22.3 ml, 0.143 mole) in 50 ml of dry tetrahydrofuran was added slowly. The mixture was maintained at the reflux temperature until all the potassium had reacted. The mixture was then cooled to room temperature and the solvent was removed under reduced pressure to leave a waxy solid identified as the potassium salt of 2-ethylhexanol.

The solid potassium salt was dissolved in propylene oxide (58 g, 70 ml, 1.0 mole) and the solution was transferred under nitrogen into a stainless steel lined pressure vessel. The tube was closed and heated to 70° for 1 hr. followed by 90° for 6 hr. The contents of the vessel were taken up in 250 ml of ether and the ether solution was washed successively with 2-100 ml portions of dilute hydrochloric acid, 2-100 ml portions of saturated sodium bicarbonate, and 2-100 ml portions of brine. The ether layer was dried over magnesium sulfate. The mixture was filtered and the solvent was removed under reduced pressure to yield 69.9 g (92%) of a pale yellow liquid. Average molecular weight found (hydroxyl number)-400. The product was identified as the propylene oxide oligomer of 2-ethylhexanol, having the formula

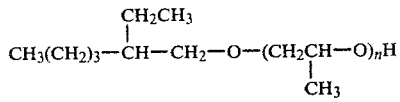

wherein n has an average value of about 4.7.

EXAMPLE 2

4.0 g polyvinyl butyral (PVB), flake with a hydroxyl content of 22.8% by weight calculated as polyvinyl alcohol were mixed in a beaker with 2.0 g (50 pph) of a propylene oxide diol, in which R is a derivative of propylene glycol, of average molecular weight of about 1025 commercially available as Pluracol P-1010 from BASF Wyandotte. After several minutes, the softened PVB flake was pressed at 140° C. for 4 minutes, finished at 3,000 psi, in a laboratory hydraulic press. The film was cut into small pieces and pressing was repeated several times for better mixing. A clear plasticized film resulted, with no visible plasticizer remaining on the surface of the film. The film was left in a closed 100 ml jar and no exudation was observed over a period of more than 10 days at a temperature of about 25° C. and a relative humidity below 90%.

COMPARATIVE EXAMPLE A

The general procedure of Example 2 was repeated, except that 3.0 g of the propylene diol were used instead of 2.0. The mixture was pressed between fluorocarbon sheets to prevent sticking, at 140°, and finishing at 3000 psi. The process was repeated three times. Beads of plasticizer exuded after storage, confirming that the quantity of plasticizer exceeded the limits of compatibility.

EXAMPLE 3

4.0 g PVB with a hydroxyl content of about 19.0% was mixed with 1.8 g (45 pph) of a propylene oxide triol with an average molecular weight of about 1500, in which R is the derivative of trimethylolpropane commercially available as Pluracol TP 1540 from BASF Wyandotte, by dry blending. The mixture was pressed, between fluorocarbon sheets to prevent sticking, at 160°, and finishing at 3000 psi. The sheet was cut and repressed three times. No exuded plasticizer was observed after storing.

EXAMPLE 4

The procedure of Example 2 was repeated, using a combination of plasticizers. 4.0 g of the PVB were mixed with 0.75 g of a propylene oxide diol, in which R is the derivative of propylene glycol, with a molecular weight of about 425, and 0.75 g of TP1540 triol. In this case a clear film was obtained with no exuded plasticizer present after storing.

COMPARATIVE EXAMPLE B

The general procedure of Example 4 was repeated, using 4.0 g of PVB with a hydroxyl content of 22.8% and 1.6 g (40 pph) of TP1540 triol plasticizer. Beads of plasticizer exuded, confirming that the quantity of plasticizer exceeded the limits of compatibility.

EXAMPLE 5

The general procedure of Example 2 was repeated, except that the plasticizer used was 45 pph of a methyl ether ended mono-ol having an average molecular weight of about 700. Excellent plasticization and compatibility were obtained.

EXAMPLE 6

The general procedure of Example 2 was repeated using PVB with 22.8% hydroxyl content and 50 pph of a butyl ether ended mono-ol (commercially available from Jefferson Chemical Company as OL-65) of average molecular weight of about 400. This level was compatible.

EXAMPLE 7

A commercially available propylene oxide diol (Pluracol P410 from BASF Wyandotte) with an average molecular weight of about 425 and polyvinyl butyral were added to an 83 mm twin screw Werner and Pfleiderer vented extruder having an L/D ratio of 20:1. The PVB used had a hydroxyl content of about 23%. The diol/PVB ratio was 31/69 (about 45 pph). The extrusion conditions used were a screwspeed 90 rpm, 200° C. melt temperature at the exit of the extruder, and 20 in. Hg. vacuum at the vent post, to remove any moisture. 80 ppm magnesium as magnesium 2-ethyl-butyrate was added to the melt as an adhesion control agent. A gear pump was used to pump the melt from the extruder to a sheeting die (all at 200° C.). Total hold up time was about 14 minutes. A 30-32 mil sheet, 30 inches wide, was extruded from the die into a 20° C. water tank to solidify the melt. The sheet was then air dried, powdered with $NaHCO_3$ and wound onto a core.

Laminates were made from this sheet by first washing off the $NaHCO_3$, conditioning at 22% RH/72° F. for 8 hours, and laminating to glass washed in water containing 350 ppm $CaCl_2$. Conditions for laminating are 135° C. for 9 minutes, at a pressure of 120 psi. Mechanical properties were determined as follows:

| | |
|---|---|
| Stiffness-5% | |
| Secant Moleculus | 460 psi |
| Mean Break Height | 3 ft./0° F., 15 ft/72° F.; |
| (5 lb. ball) | 10 ft/100° F. |
| Edge Cloud (USAS2.26) | 14/64"/2 weeks; |
| | 19/64"/4 weeks |

EXAMPLE 8

The general procedure of Example 7 was repeated, except that the plasticizer used was a commercially available oligomer of the general formula specified for the instant invention, in which R is butyl, m is 1 and the average molecular weight is about 400. The ratio of oligomer to PVB was 32/68 or 47 parts per hundred. In addition, only 40 ppm of magnesium 2-ethyl butyrate was added.

Laminates were prepared and tested as described in Example 7. The following mechanical properties were determined.

| | |
|---|---|
| Tensile strength | 3960 psi |
| Stiffness-5% Secant Modulus | 440 psi |
| Creep | 26% |
| Pummel break | 8 |
| Mean Break Height (5 lb. ball) | 8 ft/0° F.; 19.5 ft/72° F.; 10.8 ft/100° F. |

EXAMPLE 9

The general procedure of Example 7 was repeated, except that the plasticizer used was an oligomer of the general formula specified for the instant invention, in which R is ethyl hexyl, m is 1 and the average molecular weight is about 425. The ratio of oligomer to PVB was 33/67, or 49 pph. Potassium formate was used as the adhesion control agent instead of magnesium 2-ethyl butyrate.

Laminates were prepared and tested as described in Example 7. The following mechanical properties were determined.

| | |
|---|---|
| Tensile strength | 4054 psi |
| Stiffness | 982 psi |
| Pummel break | 7 |
| Mean Break Height (5 lb. ball) | 11.8 ft/0° F.; 18.2 ft/72° F.; 10.5 ft/100° F. |

EXAMPLES 10 to 20

The general procedure of Example 2 was repeated, using oligomers having the m units, R groups, Molecular Weights, concentrations, and PVB hydroxyl contents indicated in the following table:

| Example | m | R | M.W. | Conc. (pph) | PVB OH |
|---|---|---|---|---|---|
| 10 | 1 | t-butyl | 435 | 45 | 22.8% |
| 11 | 1 | cyclohexyl | 377 | 45 | 22.8% |
| 12 | 1 | ethyl | 524 | 43 | 22.8% |
| 13 | 1 | tridecyl | 479 | 43 | 22.8% |
| 14 | 1 | hexyl | 481 | 50 | 22.8% |
| 15 | 3 | derived from glycerol | 730 | 50 | 24.8 |
| 16 | 1 | ethyl | 524 | 60 | 27.2 |
| 17 | 1 | benzyl | 524 | 50 | 22.8 |
| 18 | 1 | phenyl | ca. 500 | 50 | 22.8 |
| 19 | 1 | butoxyethyl | ca. 500 | 50 | 22.8 |
| 20 | 1 | tetrahydrofurfuryl | 464 | 50 | 22.8 |

The plasticizers in each case were compatible at the concentrations indicated and provided outstanding plasticizing characteristics.

EXAMPLE 21

The general procedure of Example 2 is repeated, using 48 parts per hundred of an ethyhexyl ended mono-ol having an average molecular weight of about 425. Excellent plasticization and compatibility were obtained.

A laminate was prepared from a sheet of the plasticized PVB having a thickness of about from 0.25 to 0.30 mils. The sheeting was laminated between two layers of Lexan polycarbonate by pressing at 140° C. and a pressure of 500 psi. The laminate was clear on preparation and remained clear at ambient conditions after 5 days.

COMPARATIVE EXAMPLE C

The general procedure of Example 21 was repeated, except that the plasticizer used in the interlayer was 43 parts per hundred of tetraethylene glycol di(2-ethyl butyrate). Distinct haziness was apparent on preparation of the laminate.

EXAMPLES 22-25

Propylene glycol oligomers of the present invention were put in contact with cast polycarbonate sheeting to test the effect on crazing. In these Examples, 1"×4" strips of Lexan polycarbonate sheeting having a thickness of ⅛" were coated with several drops of oligomer. The oligomers used in Examples 22-25, respectively, were ethylhexyl mono-ol having an average molecular weight of 425, a triol prepared from the derivative of trimethylol propane having a molecular weight of 400, a diol prepared from the derivative of propylene glycol having a molecular weight of 1,025, and a mono-ol having a butyl R group and an average molecular weight of 400.

One hour after coating, each strip was manually flexed through a curve of 80°. A score was then made on the surface of the sheeting and the strip flexed again after 30 minutes. In each case, no crazing was apparent.

COMPARATIVE EXAMPLES D, E, AND F

The general procedure of Examples 22-25 was repeated, using, instead of the oligomers of those examples, plasticizers consisting essentially of dihexyl adipate, triethylene glycol di-2-ethyl butyrate, and tetraethylene glycol di-n-heptanoate. In each case, the coating with the plasticizer composition resulted in severe haze, crazing and cracking.

We claim:

1. A laminar structure comprising at least one layer of glazing material and a sheet of plasticized polyvinyl butyral having a hydroxyl content of about from 15 to 30% by weight, calculated as vinyl alcohol, and, in compatible admixture therewith, about from 10 to 70 parts per hundred parts by weight of at least one propylene oxide oligomer of the general formula

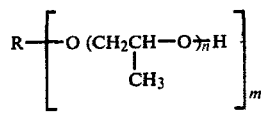

wherein R is a linear or a branched aliphatic, cycloaliphatic, aralkyl, aromatic, alkoxy alkyl or heterocyclic radical of 1 to 14 carbon atoms, n is an integer of 1 to 30 and has an average value of about from 1 to 20, and m is an integer of from 1 to 3 wherein the average molecular weight of the propylene oxide oligomers is about from 300 to 2500.

2. A laminar structure of claim 1 wherein the glazing material is glass.

3. A laminar structure of claim 1 wherein the glazing material is polycarbonate sheeting.

4. A laminar structure of claim 1 wherein the glazing material is polymethyl methacrylate sheeting.

5. A laminar structure of claim 2 comprising two sheets of glass with an interlayer of the plasticized polyvinyl butyral.

* * * * *